(12) United States Patent
Merched et al.

(10) Patent No.: US 7,907,683 B2
(45) Date of Patent: Mar. 15, 2011

(54) APPLICATION OF SUPERFAST ALGORITHMS TO A PILOT-BASED CHANNEL ESTIMATION PROCESS

(75) Inventors: Ricardo Merched, Rio de Janeiro (BR); Nabil Yousef, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 533 days.

(21) Appl. No.: 12/110,622

(22) Filed: Apr. 28, 2008

(65) Prior Publication Data
US 2009/0323871 A1 Dec. 31, 2009

(51) Int. Cl.
H04L 27/00 (2006.01)
(52) U.S. Cl. ........................................ 375/316
(58) Field of Classification Search ............. 375/240.18, 375/259, 316, 324; 379/387.02, 406.13; 324/607; 341/126, 127, 128, 155, 156, 159; 342/196; 708/404, 405; 370/210
See application file for complete search history.

(56) References Cited

U.S. PATENT DOCUMENTS
2007/0133700 A1* 6/2007 Kim et al. ............... 375/260
2008/0008261 A1* 1/2008 Baggen et al. ............ 375/296

OTHER PUBLICATIONS

Song et al. Pilot-Aided OFDM Channel Estimation in the Presence of the Guard Band, IEEE, vol. 55, No. 8, Aug. 2007, p. 1459-1465.*

* cited by examiner

*Primary Examiner* — Sam K Ahn
(74) *Attorney, Agent, or Firm* — Rahman LLC

(57) ABSTRACT

An apparatus and method of applying a superfast algorithm to a pilot-based channel estimation process includes receiving a signal comprising information bits transmitted in a wireless channel, executing the pilot-based channel estimation process having p structures for a vector of pilot structures and an upper bound N for a channel spread, determining a result of a matrix inversion of a channel correlation matrix for an error channel estimation offline without performing a matrix inversion, storing pilot information of the received signal for channel recovery in a transform domain, representing the Toeplitz inverse by a FFT representation, detecting and estimating nonzero taps of a channel impulse response of the wireless channel, obtaining a non-structured minimum mean-square-error (MMSE) estimate as a first estimate of locations of the nonzero taps, and replacing the non-structured MMSE estimate by an estimate computed by a tap detection algorithm.

20 Claims, 6 Drawing Sheets

APPLICATION OF SUPERFAST ALGORITHMS TO A PILOT-BASED CHANNEL ESTIMATION PROCESS

BACKGROUND

1. Technical Field

The embodiments herein generally relate to pilot-based channel schemes, and, more particularly, to application of superfast algorithms to a pilot-based channel estimation process.

2. Description of the Related Art

In Orthogonal-Frequency-Division-Multiplexing (OFDM) systems, channel estimation is normally performed in the frequency domain, by dividing the received signal by a limited number of pilot coefficients within the OFDM block. The resulting set of coefficients are then interpolated which are often poor estimates, in order to approximately yield the full channel information in the frequency domain. The complexity of this procedure is O(M), where M is the Discrete Fourier Transform (DFT) size, in addition to the complexity of the interpolation method.

The practical use of any equalization scheme that relies on pilot based channel estimates is often hindered by computational requirements, especially in cases where a precise estimation criterion is crucial. Moreover, the quality of the first estimate will have a great impact on the complexity of subsequent channel estimates if a channel tap detection procedure is to be employed. Several methods are approached for the channel tap detection, all of which contain an initial least square (LS) estimator where the main burden is due to the inverse matrix which was not linked to any structural problem that can be solved in an efficient manner. Also, traditional methods estimate minimum mean-square-error (MMSE) or LS channel online and tend to have high complexity in computations and storage requirements.

SUMMARY

In view of the foregoing, an embodiment herein provides a method of applying a superfast algorithm to a pilot-based channel estimation process. The method includes receiving, in a receiver, a signal comprising information bits transmitted in a wireless channel, executing the pilot-based channel estimation process having p structures for a vector of pilot structures and an upper bound N for a channel spread, the pilot-based channel estimation process being capable of inducing a Toeplitz structure in a channel correlation matrix, determining a result of a matrix inversion of the channel correlation matrix for an error channel estimation offline without performing the matrix inversion, the error channel estimation comprising a Toeplitz inverse, storing pilot information of the received signal for channel recovery in a transform domain, representing the Toeplitz inverse by a Fast Fourier Transform (FFT) representation, detecting and estimating nonzero taps of a channel impulse response of the wireless channel, obtaining a non-structured minimum mean-square-error (MMSE) estimate as a first estimate of locations of the nonzero taps, and replacing the non-structured MMSE estimate by an estimate computed by a tap detection algorithm that is not based on the matrix inversion.

Finite impulse response (FIR) filtering of the vector may be performed. The error channel estimation may be one or more of a MMSE, an iterative detection/estimation with threshold (ITD-SE), and a least-squares (LS) process. The Toeplitz inversion may be computed offline based on a Trench algorithm. Not more than 2pN coefficients are stored to recover the entire channel. The pilot information may be stored in a transform domain. 2N coefficients per pilot structure are stored in memory in the receiver in order to recover an entirety of the wireless channel.

In another aspect, a program storage device readable by computer, tangibly embodying a program of instructions executable by the computer to perform a method of applying a superfast algorithm to a pilot-based channel estimation process is provided. The method includes receiving, in a receiver, a signal comprising information bits transmitted in a wireless channel, executing a pilot-based channel estimation process having p structures for a vector of pilot structures and an upper bound N for a channel spread, the pilot-based channel estimation process being capable of inducing a Toeplitz structure in a channel correlation matrix, determining a result of a matrix inversion of the channel correlation matrix for an error channel estimation offline without performing the matrix inversion, the error channel estimation comprising a Toeplitz inverse, storing pilot information of the received signal for channel recovery in a transform domain, representing the Toeplitz inverse by a Fast Fourier Transform (FFT) representation, detecting and estimating nonzero taps of a channel impulse response of the wireless channel, obtaining a non-structured minimum mean-square-error (MMSE) estimate as a first estimate of locations of the nonzero taps, and replacing the non-structured MMSE estimate by an estimate computed by a tap detection algorithm that is not based on the matrix inversion.

Finite impulse response (FIR) filtering of the vector may be performed. The error channel estimation may be one or more of a MMSE, an iterative detection/estimation with threshold (ITD-SE), and a least-squares (LS) process. The Toeplitz inversion may be computed offline based on a Trench algorithm. Not more than 2pN coefficients are stored to recover the entire channel. The pilot information may be stored in a transform domain. 2N coefficients per pilot structure are stored in memory in the receiver in order to recover an entirety of the wireless channel.

In yet another aspect, an apparatus for applying a superfast algorithm to a pilot-based channel estimation process includes a receiver that receives a signal comprising information bits transmitted in a wireless channel, a memory unit operatively connected to the receiver and comprising a programmable set of instructions, a display unit operatively connected to the memory unit, and a processor. The processor executes a pilot-based channel estimation process having p structures for a vector of pilot structures and an upper bound N for a channel spread, the pilot-based channel estimation process being capable of inducing a Toeplitz structure in a channel correlation matrix, determines a result of a matrix inversion of the channel correlation matrix for an error channel estimation offline without performing a matrix inversion, the error channel estimation comprising a Toeplitz inverse, stores pilot information of the received signal for channel recovery in a transform domain, represents the Toeplitz inverse by a Fast Fourier Transform (FFT) representation, detects and estimates nonzero taps of a channel impulse response of the wireless channel, obtains a non-structured minimum mean-square-error (MMSE) estimate as a first estimate of locations of the nonzero taps, and replaces the non-structured MMSE estimate by an estimate computed by a tap detection algorithm that is not based on the matrix inversion.

The error channel estimation may be one or more of a MMSE, an iterative detection/estimation with threshold (ITD-SE), and a least-squares (LS) process. The Toeplitz inversion may be computed offline based on a Trench algorithm. Not more than 2pN coefficients are stored to recover the entire channel. The pilot information may be stored in a transform domain. 2N coefficients per pilot structure are stored in memory in the receiver in order to recover an entirety of the wireless channel.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
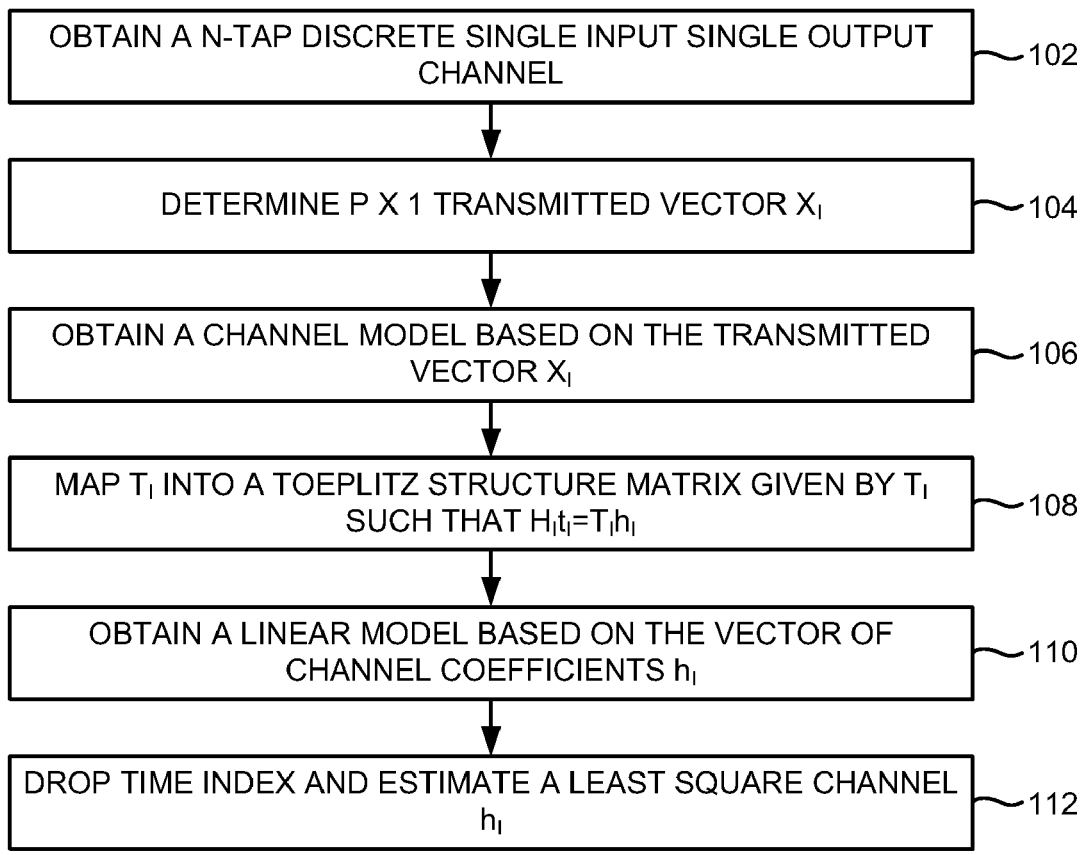
FIG. 1 is a flow diagram illustrating a method of fast channel estimation in block transmission schemes.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a method of applying a superfast algorithm to a pilot-based channel estimation process. The method includes receiving, in a receiver, a signal comprising information bits transmitted in a wireless channel, executing the pilot-based channel estimation process having p structures for a vector of pilot structures and an upper bound N for a channel spread, the pilot-based channel estimation process being capable of inducing a Toeplitz structure in a channel correlation matrix, determining a result of a matrix inversion of the channel correlation matrix for an error channel estimation offline without performing a matrix inversion, the error channel estimation comprising a Toeplitz inverse, storing pilot information of the received signal for channel recovery in a transform domain, representing the Toeplitz inverse by a Fast Fourier Transform (FFT) representation, detecting and estimating nonzero taps of a channel impulse response of the wireless channel, obtaining a non-structured minimum mean-square-error (MMSE) estimate as a first estimate of locations of the nonzero taps, and replacing the non-structured MMSE estimate by an estimate computed by a tap detection algorithm that is not based on the matrix inversion. Referring now to the drawings, and more particularly to FIGS. 1 through 8, where similar reference characters denote corresponding features consistently throughout the figures, there are shown preferred embodiments.

FIG. 1 is a flow diagram illustrating a method of fast channel estimation in block transmission schemes according to an embodiment herein. In step 102, a N-tap discrete single-input-single-output (SISO) channel is obtained via a P×P pseudocirculant matrix and is given as:

$$H(z) \stackrel{\Delta}{=} H_0 + H_1 z^{-1} \quad (1)$$

The interblock interference is assumed to be caused by the term $H_1$ is removed prior to this, according to a zero padding (TZ) or a leading-zeros (LZ) scheme. The remanescent effect of the channel is then represented by $H_i$. The $H_i$ is a M×P fat matrix (in the LZ case) or a full tank rank matrix and P=N+M−1 is the minimum length required for the transmitted block. In one embodiment, let $s_i$ is the M×1 information data vector at time instant i.

In step 104, a P×1 transmitted vector $x_i$ is determined and is given as:

$$x_i = A_i s_i + t_i. \quad (2)$$

The $A_i$ is a P×M precoder matrix, and $t_i$ is the superimposed P×1 training vector used for channel estimation within the i-th block transmission. In step 106, a resulting channel model is obtained based on the transmitted vector $x_i$ and given by:

$$y_i = H_i A_i s_i + H_i t_i + v_i, \quad (3)$$

where $H_i$ is given as:

$$H_i = \begin{bmatrix} h(N-1) & 0 & \cdots & 0 \\ h(N-2) & h(N-1) & \ddots & \vdots \\ \vdots & \ddots & \ddots & 0 \\ h(0) & \ddots & \ddots & 0 \\ \vdots & \ddots & \ddots & \vdots \\ 0 & \ddots & \ddots & h(N-1) \\ \vdots & \ddots & \ddots & \vdots \\ 0 & \cdots & 0 & h(0) \end{bmatrix}. \quad (4)$$

Without loss of generality, the channel length is assumed to be known as a priori. In step 108, $t_i$ is mapped into a similar Toeplitz-structure matrix given by $T_i$ based on the Toeplitz structure of $H_i$, such that $H_i t_i = T_i h_i$, where $h_i$ is the vector of channel coefficients $h_i = [h_i^*(0) \; h_i^*(1) \ldots h_i^*(N-1)]^*$, where * denotes the complex conjugate transposition. In step 110, a linear model is obtained based on the vector of channel coefficients and is given as:

$$y = T_i h_i + n, \quad (5)$$

where the effective noise is given as:

$$n \stackrel{\Delta}{=} H_i A_i s_i + v. \quad (6)$$

In step 112, a time index is dropped for the compactness of notation, and a least square channel is estimated and given as:

$$\hat{h}=(T^*T)^{-1}T^*y. \quad (7)$$

However, this estimate is to be computed due to the matrix inverse $(T^*T)^{-1}$, since the product $T^*y$ can be obtained via fast convolution methods. Because of a pre windowed structure and a post windowed structure of T, the product $(T^*T)$ has a Hermitian Toeplitz structure for which very efficient representations in terms of fast transforms exists. No matrix inversion is needed, since it relies purely on pilots.

Figure 2:
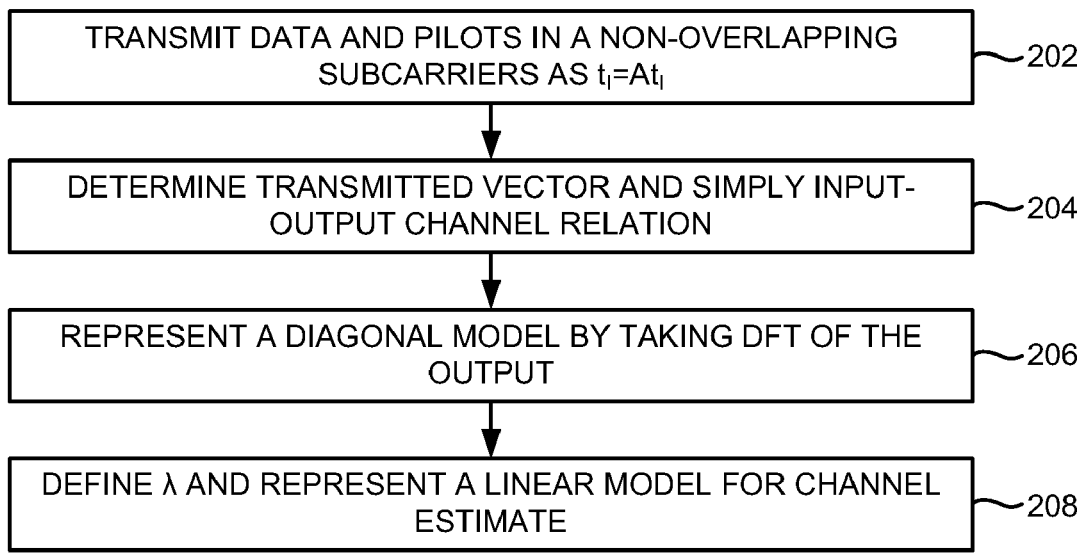
FIG. 2 is a flow diagram illustrating an OFDM method of estimating a LS channel.

FIG. 2 is a flow diagram illustrating a traditional OFDM method of estimating a LS channel according to an embodiment herein. In step 202, data and pilots are transmitted in a non-overlapping subcarriers as $t_i = At_i$ based on the following association which is given as $t_i \rightarrow At_i$. In other words, $t_i = 0$ at the entries where $s_i \neq 0$ and $$A = \begin{bmatrix} I_{P-M \times M} \\ I_M \end{bmatrix} F^*$$

(i.e., Inverse Discrete Fourier Transform (IDFT)+cyclic-prefixing inducing matrix). In step 204, the transmitted vector is determined and written as $x_i = A(t_i + s_i)$ and the input-output channel relation simplifies to:

$$y_i = C_i F^*(t_i + s_i) + v_i, \quad (8)$$

where $C_i$ is a circulant matrix, with first row given as $[h_i(0) \; 0 \ldots 0 \; h_i(N-1) \ldots h_i(1)]$.

In step 206, since $C = F^* \Lambda F$, a diagonal model is represented as:

$$y_i = \Lambda_i x_i + v_i \quad (9)$$

by taking the DFT of the output. In step 208, $\lambda \triangleq \text{diag}(\Lambda_i)$ is defined and a linear model for channel estimate is represented and expressed as:

$$\lambda = \sqrt{M} \, F_M \begin{bmatrix} h \\ 0 \end{bmatrix}, \quad (10)$$

where h represents the first column of C. The channel length is assumed to be unknown and upper-bounded by N, which is assumed to be a power of 2 for computational reasons. The time-frequency domain relation of above equation implies the following linear model for channel estimation:

$$y' = \sqrt{M} \Delta_t \bar{F}_M h + n, \quad (11)$$

where $\Delta_t$, is defined as $\Delta_t \triangleq \text{diag}(t)$ and where:

$$n \triangleq \Lambda_s s + v'. \quad (12)$$

Due to the non-overlapping structure of pilots and data, the MMSE estimate of h is given as:

$$\hat{h} = \underbrace{\left( \frac{\sigma_v^2}{\sqrt{M}} R_h^{-1} + \sqrt{M} \, \bar{F}_M^* \Delta_t^* \Delta_t \bar{F}_M \right)^{-1}}_{Q} \bar{F}_M^* \Delta_t^* y. \quad (13)$$

and Q can be written as:

$$Q = \frac{\sigma_v^2}{\sqrt{M}} R_h^{-1} + \sqrt{M} \, [I_N \quad _{N,M-N}] F_M^* \Delta_t^* \Delta_t F_M \begin{bmatrix} I_N \\ _{M-N,N} \end{bmatrix}, \quad (14)$$

where $\bar{y} \triangleq F_M^* \Delta_t^* y$. $F_M^* \Delta_t^* \Delta_t F_M$ is circulant, and if it is assumed that $R_h^{-1} = \sigma_v^2 I$, the matrix to be inverted has a Hermitian Toeplitz structure.

In case $R_h^{-1} \rightarrow 0$, the MMSE reduces to a pure LS estimator, and without the regularization term, the existence of the above inverse requires that $F_M^* \Delta_t^* \Delta_t F_M$ is invertible. In the case of non-overlapping data and pilots, this requires the number of pilots to be at least equal to the assumed channel length. Hence the following can be computed:

$$\hat{h} = Q^{-1} \bar{y} \quad (15)$$

Figure 3:
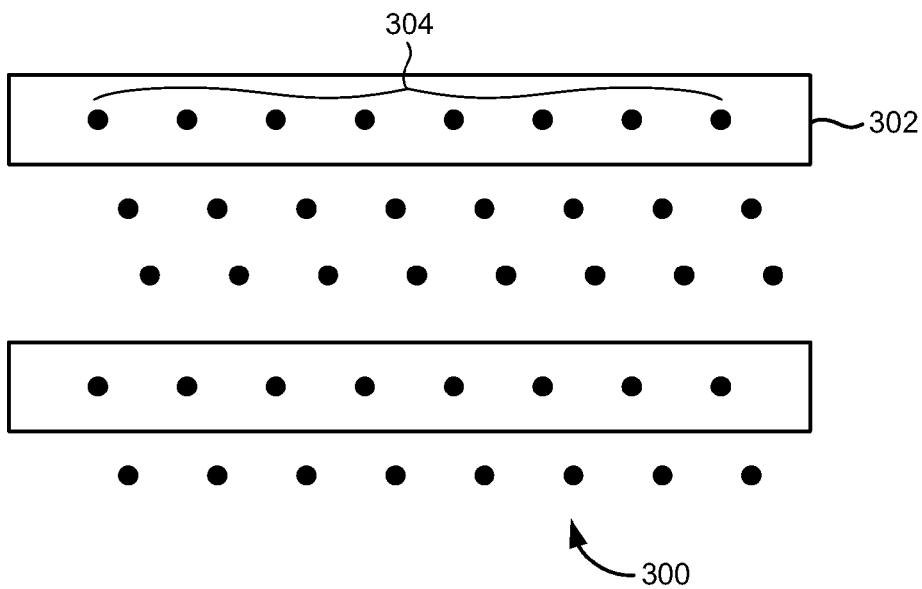
FIG. 3 is a schematic diagram of a pilot structure having an OFDM block containing pilots according to an embodiment herein.

FIG. 3 is a schematic diagram of a pilot structure 300 having an OFDM block 302 containing pilots 304 according to an embodiment herein. An N size vector which contains all the information on the pilots can be stored because of the persymmetry property of the Hermitian Toeplitz structure. Finite impulse response (FIR) filtering of the N size vectors can be performed with $\bar{y}$. In Digital Video Broadcasting (DVB) standards, only four pilot structures are needed. Therefore, only four different pilot vectors have to be stored since the moving pilots 304 possess a slanting structure that repeats itself at every four OFDM blocks 302. Not more than 2pN coefficients are stored to recover the entire channel, where for at least one of spare channels in at least one of a turbo equalization and DVB system, where "p" is the number of pilot structures that appear before repeating themselves again. For example, p=3.

Figure 4:
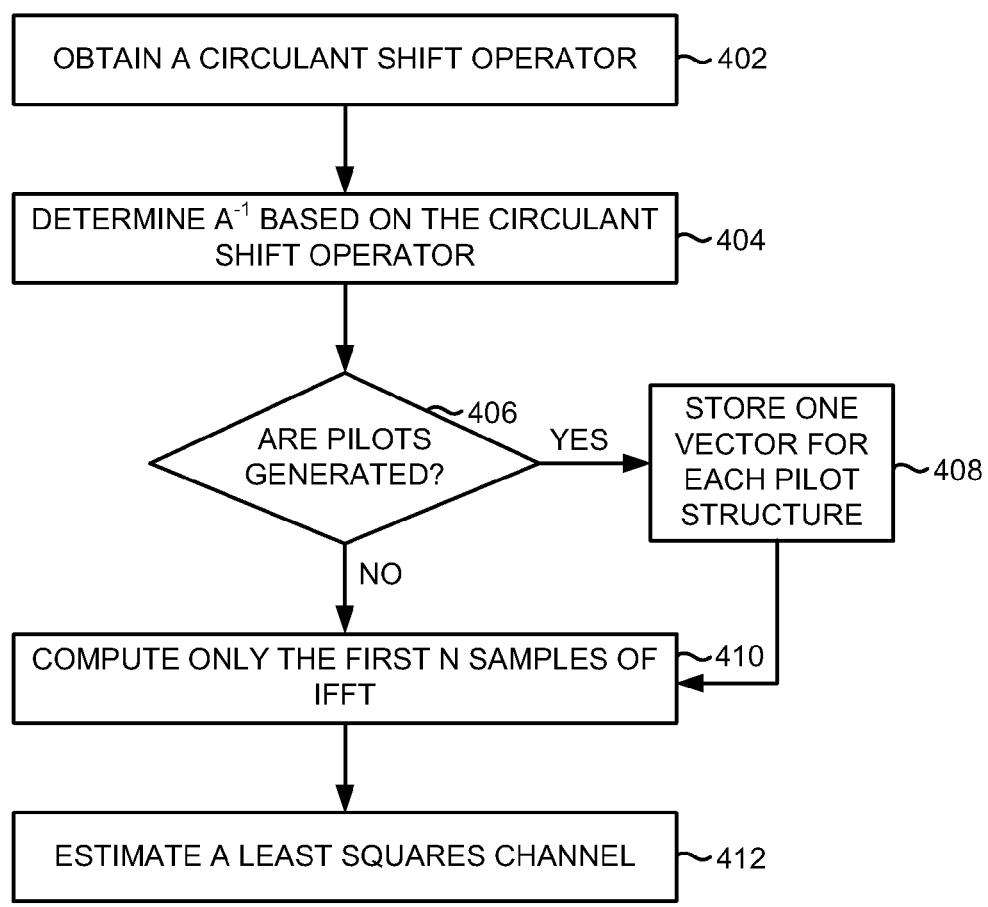
FIG. 4 is a flow diagram illustrating a method of storing one vector for each pilot structure and estimating a MMSE or LS channel via a superfast Toeplitz algorithm according to an embodiment herein.

FIG. 4 is a flow diagram illustrating a method of storing one vector for each pilot structure and estimating a MMSE or LS channel via a superfast Toeplitz algorithm according to an embodiment herein. In step 402, a circular shift operator $Z_\phi$ is obtained and is defined as:

$$Z_\phi = \begin{bmatrix} 0 & 0 & \ldots & \ldots & \phi \\ 1 & 0 & \ldots & 0 & 0 \\ 0 & 1 & \ldots & 0 & 0 \\ \vdots & \vdots & \vdots & \vdots & \vdots \\ 0 & 0 & \ldots & 1 & 0 \end{bmatrix}, . \quad (16)$$

The Toeplitz structure of A yields a displacement rank, that does not exceed two, and determines the matrix A. This is represented as:

$$\nabla_\phi(A) = A - Z_\phi A Z_{1/\phi}^T \quad (17)$$

This matrix has rank two. A $\phi$-cyclic displacement rank is propogated through a matrix inversion. In step 404, $A^{-1}$ is determined based on the circular operator using the displacement theory and is expressed as:

$$A^{-1} = \frac{1}{x_0}.$$

$$\left\{ \begin{bmatrix} b_0 & 0 & \cdots & \cdots & 0 \\ b_1 & b_0 & & & \vdots \\ \vdots & b_1 & b_0 & & \vdots \\ \vdots & & \ddots & \ddots & 0 \\ b_{N-1} & \cdots & \cdots & b_1 & b_0 \end{bmatrix} \begin{bmatrix} c_{N-1} & c_{N-2} & \cdots & c_0 \\ 0 & c_{N-1} & & \vdots \\ \vdots & & \ddots & \vdots \\ \vdots & & & c_{N-2} \\ 0 & \cdots & 0 & c_{N-1} \end{bmatrix} - \begin{bmatrix} 0 & 0 & \cdots & \cdots & 0 \\ c_0 & 0 & & & \vdots \\ \vdots & c_0 & \ddots & & \vdots \\ \vdots & & \ddots & \ddots & 0 \\ c_{N-2} & \cdots & \cdots & c_0 & 0 \end{bmatrix} \begin{bmatrix} 0 & b_{N-1} & \cdots & \cdots & b_1 \\ 0 & 0 & b_{N-1} & & \vdots \\ \vdots & & \ddots & \ddots & \vdots \\ \vdots & & & \ddots & b_{N-1} \\ 0 & \cdots & \cdots & 0 & 0 \end{bmatrix} \right\} \quad (18)$$

where:

$$b = [b_0 \ b_1 \ \ldots \ b_{N-1}]^T, b_0 \neq 0, \quad (19)$$

$$c = [c_0 \ c_1 \ \ldots \ c_{N-1}]^T,$$

where b and c are the first column and first row of $A^{-1}$ respectively. The displacement theory is related to the Gohberg-Semencul formula.

In step 406, it is checked whether pilots 304 are generated by shifting part of the overall coefficients in the repeating structure (as shown in FIG. 3A). If the pilots are generated (Yes), each vector is stored for each pilot structure, in step 408. Part of the pilots 304 have a fixed position. Else (No), only the first N samples of the IFFT of $\Delta_t^* y$ is computed, in step 410.

In the DVB standard, approximately 9% of the overall transmitted OFDM symbols are pilots (only 9% of the entries of $\Delta_t^* y$ are non zeros). The pruned-FFT algorithms exploit the sparse nature of the input and the useful FFT output bins. The channel length is assumed to be unknown. An upper bound for its length, say $N_{max}$ can be assumed. $N_{max}=M/4$ (however the cyclic prefix M/4 can be about 10 times longer than the actual channel spread) is implicitly assumed. The channel spread yields a O(0.7M) complexity or a O(M/5) complexity without a channel interpolation. The channel spread is 10 times shorter than a cyclic prefix for a TU-6 model. The inherent Toeplitz inversion is 6×6 and represented by the Fast Fourier Transform (FFT) to yield a complexity of $O(N \log_2 N)$. In step 412, the least squares (LS) channel is estimated and an actual solution for $\hbar_0$ in this case is given as:

$$\hbar_0 = (\sigma_v^2 R_h^{-1} + F_M^* \Delta_t^* \Delta_t F_M)^{-1} F_M^* \Delta_t^* y = P\bar{y}, \quad (20)$$

As $P^{-1}$ has a Hermitian Toeplitz structure, several fast algorithms are available for its inversion and can be represented via $N_{max} \times N_{max}$ circulant factors and is stated as: let $p_0 = (p_{0,k})_{k=0}^N$ and $\bar{p}_0 = (\bar{p}_{0,k})_{k=0}^N$ be the first column and first row of P respectively. Then, if $p_{0,0} \neq 0$, $$P = \frac{1}{p_{0,0}(\phi - \psi)} [C_\phi(p_0) C_\phi(Z_\phi \bar{p}_0) - C_\psi(Z_\psi \bar{p}_0) C_\phi(p_0)] \quad (21)$$

where $\phi$ and $\psi \neq \phi$ are any complex numbers, and the $\phi$-circulant matrix $C_\phi(g)$ is defined as:

$$C_\phi(g) = \begin{bmatrix} g_0 & \phi g_{N-1} & \cdots & \cdots & \phi g_1 \\ g_1 & g_0 & \phi g_{N-1} & \ddots & \vdots \\ \vdots & g_1 & \ddots & \ddots & \vdots \\ \vdots & & \ddots & \ddots & \phi g_{N-1} \\ g_{N-1} & \cdots & \cdots & g_1 & g_0 \end{bmatrix} \quad (22)$$

where $Z_\phi$ is defined in Eq. (16). The above pseudo-circulant matrix has the following eigenvalue decomposition:

$$C_\phi(g) = D_\phi^* F^* \Lambda_\phi F D_\phi, \quad (23)$$

where $\Lambda_\phi = \sqrt{M} \text{diag}(FD_\phi g)$, and $D_\phi = \sqrt{M} \text{diag}(FEp_0)$.

E is diagonal with the ii element given by $\psi^{i/N_{max}}$. Because of the persymmetry property of Toeplitz matrices as stated above, the above factorization further implies that only one column of P is necessary to represent it through a fast transform. In case $p_{0,0}=0$, an alternative factorization relies on two columns of P. The case where $\phi=1$ and $\psi=-1$ corresponds to circulant and skew-circulant matrices. Using Eq. (23):

$$P = \frac{1}{p_{0,0}(\phi - \psi)} D_\psi^* F_{N_{max}}^* \begin{bmatrix} \Lambda_{\psi,p_0} F_{N_{max}}^* D_\psi F_{N_{max}}^* \Lambda_{\phi,zp_0} - \\ \Lambda_{\psi,zp_0} F_{N_{max}} D_\psi F_{N_{max}}^* \Lambda_{\phi,p_0} \end{bmatrix} F_{N_{max}} \quad (24)$$

The multiplication of P by a vector requires six FFTs of size $N_{max}$, and only $2N_{max}$ coefficients need to be stored. The exact quantities can be computed offline (e.g., via the Trench algorithm for Toeplitz matrices inversion). The total storage required amounts to $8N_{max}$. The overall complexity amounts to 6 FFTs of size $N_{max}$ and one pruned FFT of size M. In case the frequency-domain channel is to be computed for the purpose of equalization, an additional FFT of size M is used.

Figure 5:
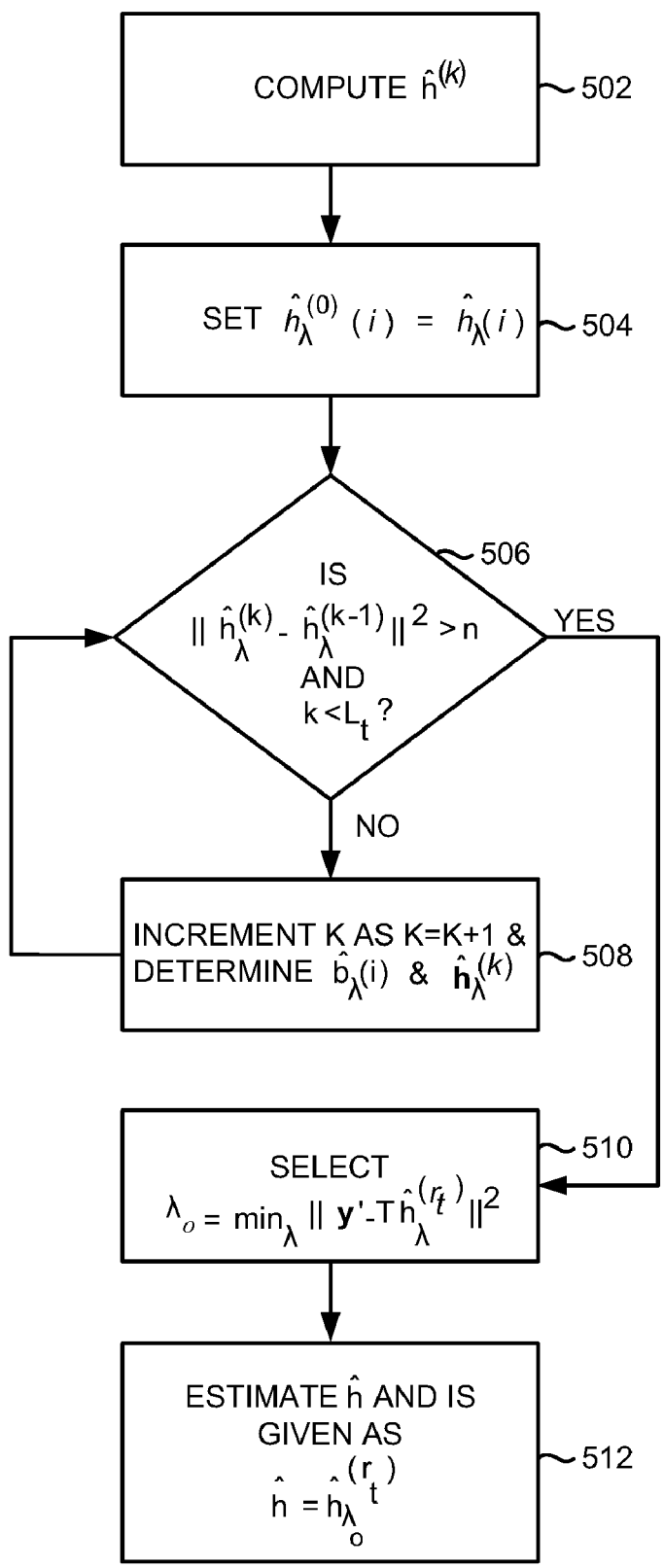
FIG. 5 is a flow diagram illustrating a method of estimating a MMSE or a LS channel through a tap detection algorithm according to an embodiment herein

FIG. 5 is a flow diagram illustrating a method of estimating a MMSE or a LS channel through a tap detection algorithm according to an embodiment herein. In a preferred embodiment, a superfast algorithm is applied to a pilot-based channel estimation scheme having p structures for a vector of pilots and an upper bound N for a channel spread in an ITS-SE algorithm. The pilot-based channel estimation scheme is capable of inducing a Toeplitz structure in a channel correlation matrix. The error channel estimation is estimated to reduce complexity and to allow a zero tap detection. The zero tap detection exhibits a superior gain in performance. The ITS-SE algorithm includes L which is a threshold value and $h_{max} = \|\hbar\|_\infty$, such that $\tau = h_{max}/L$, T is a convolution matrix, B contains vectors at the entries corresponding to the actual non zero tap positions and zeros, $B^{(k)} = \text{diag}(b^k)$, where $B^{(k)}$ corresponds to a diagonal matrix constructed from the non zero tap positions estimation at a k-th iteration, and $R_h = I$ and $R_v = \sigma_v^2 I$.

In step 502, $\hbar^{(k)} = (\sigma_v^2 I + T^* T)^{-1} T^* y$ is computed via a fast method. In step 504, the following expression is set: $\hbar_l^{(0)}(i) = \hbar(i)$ for $l = \tau, 2\tau, \ldots, h_{max}$. In step 506, $(\|\hbar_l^{(k)} - \hbar_l^{(k-1)}\|^2 > \eta)$ and $k < L_t$ conditions are checked. If the condition is false (No), k is incremented to: k=k+1 and $\hat{b}_l(i) = (\text{sign}(|\hbar_l^{(k-1)}(i)|-1)+1)/2$ and $\hbar_l^{(k)} = (\sigma_v^2 I + B^{(k)} T^* T B^{(k)})^{-1} B^{(k)} T^* y$ in step 508, else (if true (Yes)) $l_o = \min_l \|y' - T\hbar_l^{(r_l)}\|^2$ is selected, in step 510. In step 512, $\hbar$ is estimated and given as $\hbar = \hbar_{l_o}^{(r_l)}$.

Figure 6:
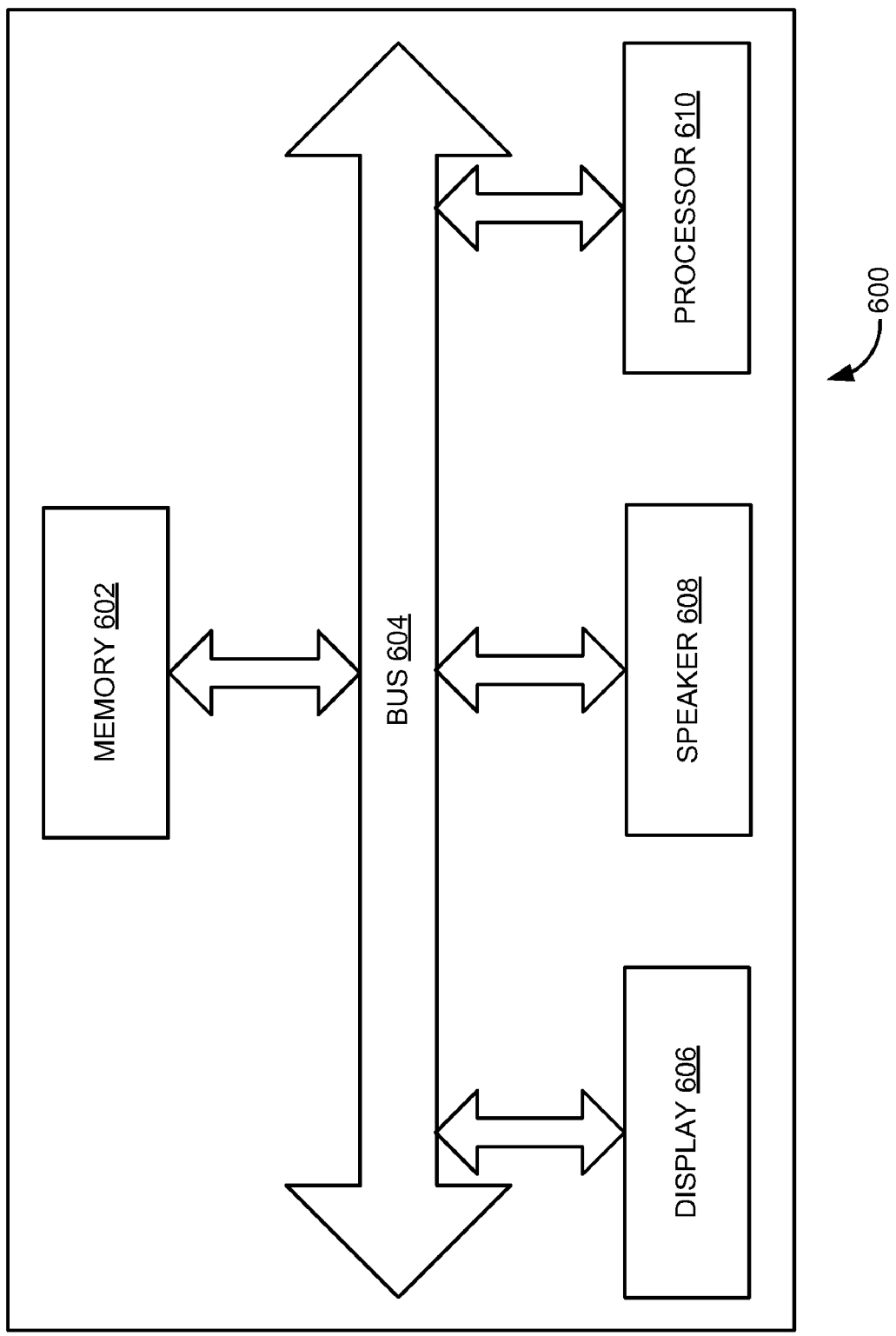
FIG. 6 illustrates an exploded view of a receiver according to an embodiment herein.

FIG. 6 illustrates exploded view of a receiver 600 having an a memory 602 having a computer set of instructions, a bus 604, a display 606, a speaker 608, and a processor 610 capable of processing a set of instructions to perform any one or more of the methodologies herein, according to an embodiment herein. The processor 610 may also enable digital content to be consumed in the form of video for output via one or more displays 606 or audio for output via speaker and/or earphones 608. The processor 610 may also carry out the methods described herein and in accordance with the embodiments herein. Digital content may also be stored in the memory 602 for future processing or consumption. The memory 602 may also store program specific information and/or service information (PSI/SI), including information about digital content (e.g., the detected information bits) available in the future or stored from the past.

A user of the receiver 600 may view this stored information on display 606 and select an item of for viewing, listening, or other uses via input, which may take the form of keypad, scroll, or other input device(s) or combinations thereof. When digital content is selected, the processor 610 may pass information. The content and PSI/SI may be passed among functions within the receiver 600 using bus 604.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
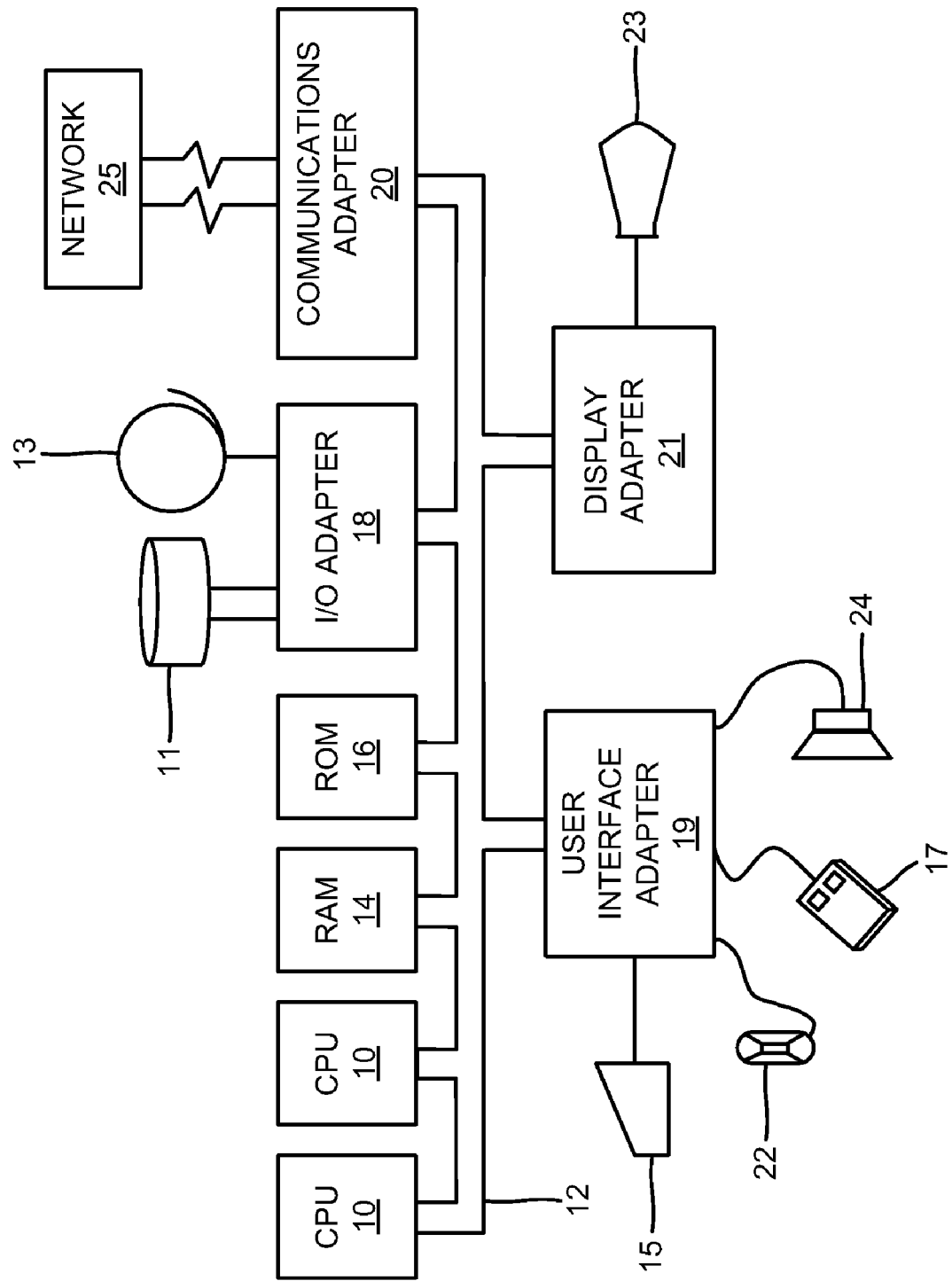
FIG. 7 illustrates a schematic diagram of a computer architecture used in accordance with the embodiments herein.

A representative hardware environment for practicing the embodiments herein is depicted in FIG. 7. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 8:
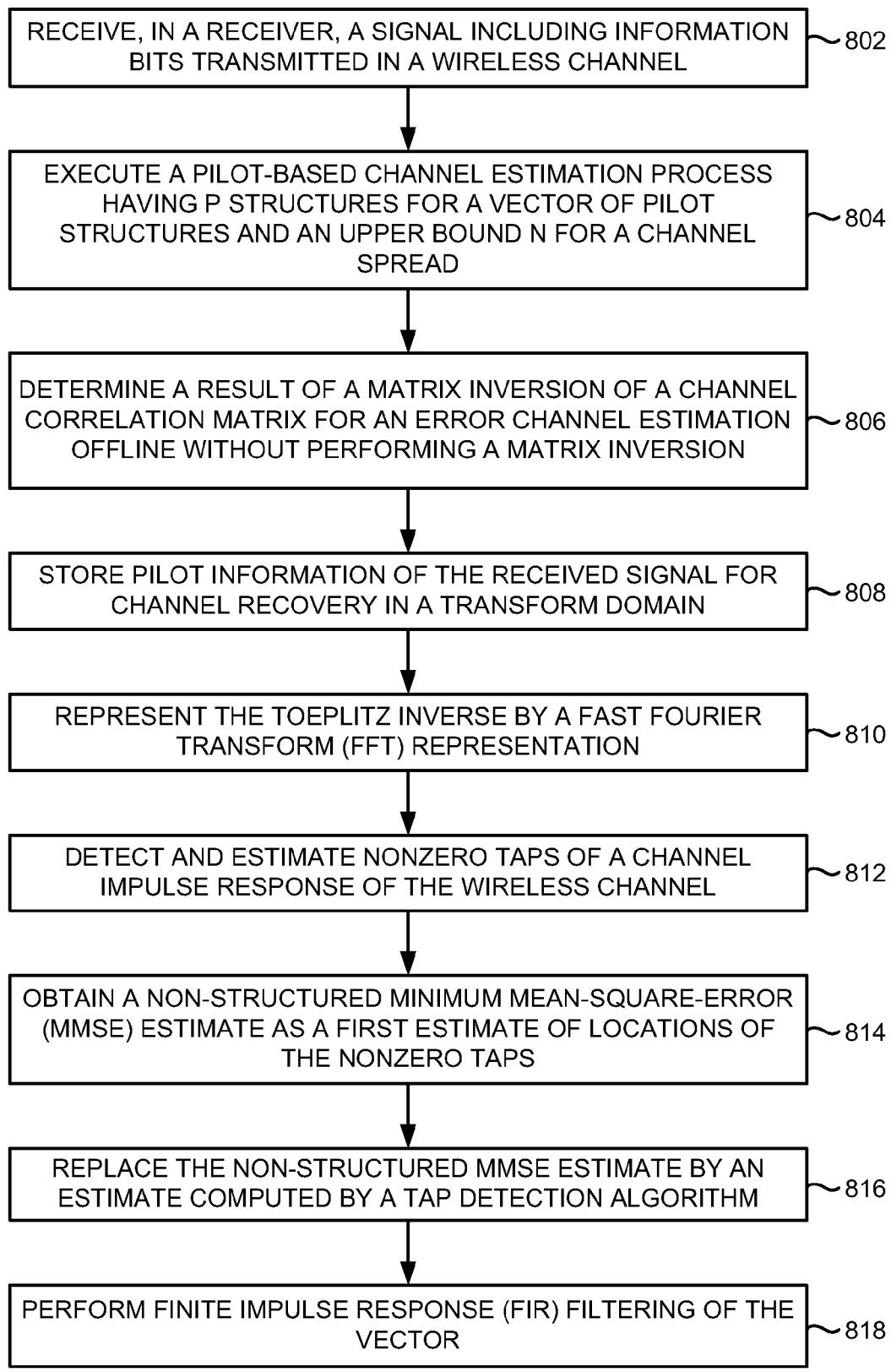
FIG. 8 illustrates a flow diagram of a method of applying a superfast algorithm to a pilot-based channel estimation process according to an embodiment herein.

FIG. 8 illustrates a flow diagram of a method of applying a superfast algorithm to a pilot-based channel estimation process according to an embodiment herein. In step 802, a signal including information bits transmitted in a wireless channel is received in a receiver. In step 804, the pilot-based channel estimation process having p structures for a vector of pilot structures and an upper bound N for a channel spread is executed. The pilot-based channel estimation process is capable of inducing a Toeplitz structure in a channel correlation matrix. In step 806, a result of a matrix inversion of the channel correlation matrix for an error channel estimation offline is determined without performing a matrix inversion. (e.g., via a Trench Algorithm). The error channel estimation includes a Toeplitz inverse. In step 808, pilot information of the received signal for channel recovery is stored in a transform domain. In one embodiment, the pilot information is stored in an N size vector because of the persymmetry property of the Hermitian Toeplitz structure. In step 810, the Toeplitz inverse is represented by a Fast Fourier Transform (FFT) representation.

In step 812, nonzero taps of a channel impulse response of the wireless channel are detected and estimated. In step 814, a non-structured minimum mean-square-error (MMSE) estimate is obtained as a first estimate of locations of the nonzero taps. In step 816, the non-structured MMSE estimate is replaced by an estimate computed by a tap detection algorithm. In one embodiment, the tap detection algorithm is not based on the matrix inversion. In step 818, Finite Impulse Response (FIR) filtering of the vector is performed.

The embodiments herein provide a more precise and efficient method of estimating the actual channel impulse response via optimal MMSE or LS estimators which not only guarantees a considerably reduced sets of parameters, but also avoids an un-precise frequency domain interpolation, especially in the case of fast time varying channels where ICI turns channel tracking into a difficult task. The advantage of this lies in that the necessary matrix inversion for a MMSE or LS channel estimation can be performed offline and the pilot information needed for channel recovery can easily be stored in the transform domain. For a given structure, for the vectors of pilots and an upper bound for the channel delay spread, say N, it is only necessary to store 2N coefficients per pilot structure in order to recover entire channel. The channel estimation is useful in turbo equalization scenarios that make use of decisions directed estimates.

An efficient LS or MMSE estimator not only reduces complexity of this first step, but also allows for precise zero-tap detections so that subsequent channel estimations can be computed exactly, without relying on any matrix structure. It shows that an estimator takes into account the zero tap positions to exhibit superior gain in performance. For instance, for a Typical Urban-6 model, the approach can be easily extended to fast varying channels via proper ICI modeling and can be adapted to any symbol equalization method which are simply based on 6×6 matrices inverses. This can be implemented in Digital Video Broadcasting for Handheld (DVB-H) devices and in the baseband chip sets which support standards that include DVB-H/ISDB-T/DMB/MediaFlo.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of applying a superfast algorithm to a pilot-based channel estimation process, said method comprising:
receiving, in a receiver, a signal comprising information bits transmitted in a wireless channel;
executing the pilot-based channel estimation process having p structures for a vector of pilot structures and an upper bound N for a channel spread, said pilot-based channel estimation process capable of inducing a Toeplitz structure in a channel correlation matrix, wherein said p and said N are integers;
determining a result of a matrix inversion of said channel correlation matrix for an error channel estimation offline without performing a matrix inversion, said error channel estimation comprising a Toeplitz inverse;
storing pilot information of the received signal for channel recovery in a transform domain;
representing said Toeplitz inverse by a Fast Fourier Transform (FFT) representation;
detecting and estimating nonzero taps of a channel impulse response of said wireless channel;
obtaining a non-structured minimum mean-square-error (MMSE) estimate as a first estimate of locations of said nonzero taps; and
replacing said non-structured MMSE estimate by an estimate computed by a tap detection algorithm.

2. The method of claim 1, wherein said error channel estimation is at least one of a MMSE, an iterative detection/estimation with threshold (ITD-SE), and a least-squares (LS) process.

3. The method of claim 1, wherein said Toeplitz inverse is computed offline based on a Trench algorithm.

4. The method of claim 1, wherein not more than 2×p×N coefficients are stored to recover all of said channel.

5. The method of claim 1, wherein said tap detection algorithm is not based on said matrix inversion.

6. The method of claim 1, wherein 2×N coefficients per pilot structure are stored in a memory in said receiver in order to recover an entirety of said wireless channel.

7. The method of claim 1, further comprising performing finite impulse response (FIR) filtering of said vector.

8. A non-transitory program storage device readable by computer, tangibly embodying a program of instructions executable by said computer to perform a method of applying a superfast algorithm to a pilot-based channel estimation process, said method comprising:
receiving, in a receiver, a signal comprising information bits transmitted in a wireless channel;
executing the pilot-based channel estimation process having p structures for a vector of pilot structures and an upper bound N for a channel spread, said pilot-based channel estimation process capable of inducing a Toeplitz structure in a channel correlation matrix, wherein said p and said N are integers;
determining a result of a matrix inversion of said channel correlation matrix for an error channel estimation offline without performing a matrix inversion, said error channel estimation comprising a Toeplitz inverse;
storing pilot information of the received signal for channel recovery in a transform domain;
representing said Toeplitz inverse by a Fast Fourier Transform (FFT) representation;
detecting and estimating nonzero taps of a channel impulse response of said wireless channel;
obtaining a non-structured minimum mean-square-error (MMSE) estimate as a first estimate of locations of said nonzero taps; and
replacing said non-structured MMSE estimate by an estimate computed by a tap detection algorithm.

9. The program storage device of claim 8, wherein said error channel estimation is at least one of a MMSE, an iterative detection/estimation with threshold (ITD-SE), and a least-squares (LS) process.

10. The program storage device of claim 8, wherein said Toeplitz inverse is computed offline based on a Trench algorithm.

11. The program storage device of claim 8, wherein not more than 2×p×N coefficients are stored to recover all of said channel.

12. The program storage device of claim 8, wherein said tap detection algorithm is not based on said matrix inversion.

13. The program storage device of claim 8, wherein 2×N coefficients per pilot structure are stored in memory in said receiver in order to recover an entirety of said wireless channel.

14. The program storage device of claim 8, wherein said method further comprises performing finite impulse response (FIR) filtering of said vector.

15. An apparatus for applying a superfast algorithm to a pilot-based channel estimation process, said apparatus comprising:
  a receiver that receives a signal comprising information bits transmitted in a wireless channel;
  a memory unit operatively connected to said receiver and comprising a programmable set of instructions;
  a display unit operatively connected to said memory unit; and
  a processor that:
    executes the pilot-based channel estimation process having p structures for a vector of pilot structures and an upper bound N for a channel spread, said pilot-based channel estimation process capable of inducing a Toeplitz structure in a channel correlation matrix, wherein said p and said N are integers;
    determines a result of a matrix inversion of said channel correlation matrix for an error channel estimation offline without performing a matrix inversion, said error channel estimation comprising a Toeplitz inverse;
    stores pilot information of the received signal for channel recovery in a transform domain;
    represents said Toeplitz inverse by a Fast Fourier Transform (FFT) representation;
    detects and estimates nonzero taps of a channel impulse response of said wireless channel;
    obtains a non-structured minimum mean-square-error (MMSE) estimate as a first estimate of locations of said nonzero taps; and
    replaces said non-structured MMSE estimate by an estimate computed by a tap detection algorithm.

16. The apparatus of claim 15, wherein said error channel estimation is at least one of a MMSE, an iterative detection/estimation with threshold (ITD-SE), and a least-squares (LS) process.

17. The apparatus of claim 15, wherein said Toeplitz inverse is computed offline based on a Trench algorithm.

18. The apparatus of claim 15, wherein not more than 2×p×N coefficients are stored to recover all of said channel.

19. The apparatus of claim 15, wherein said tap detection algorithm is not based on said matrix inversion.

20. The apparatus of claim 15, wherein 2×N coefficients per pilot structure are stored in memory in said receiver in order to recover an entirety of said wireless channel.

* * * * *